United States Patent
Carson

(10) Patent No.: US 11,498,592 B2
(45) Date of Patent: Nov. 15, 2022

(54) SYSTEM AND METHOD FOR MANAGING THE ENERGY SUPPLIED TO A TRANSPORT VEHICLE, AND CORRESPONDING TRANSPORT VEHICLE

(71) Applicant: ALSTOM Transport Technologies, Saint-Ouen-sur-Seine (FR)

(72) Inventor: Neil Carson, Sarrouilles (FR)

(73) Assignee: ALSTOM Transport Technologies, Saint-Ouen-sur-Seine (FR)

( * ) Notice: Subject to any disclaimer, the term of this patent is extended or adjusted under 35 U.S.C. 154(b) by 3 days.

(21) Appl. No.: 17/143,458

(22) Filed: Jan. 7, 2021

(65) Prior Publication Data

US 2021/0213979 A1  Jul. 15, 2021

(30) Foreign Application Priority Data

Jan. 10, 2020 (FR) ..................... 20 00205

(51) Int. Cl.
*H02J 7/00* (2006.01)
*B61C 5/00* (2006.01)
(Continued)

(52) U.S. Cl.
CPC .............. *B61C 5/00* (2013.01); *F02B 63/042* (2013.01); *B60L 2200/26* (2013.01); *B61C 3/00* (2013.01);
(Continued)

(58) Field of Classification Search
CPC . B61C 5/00; B61C 3/00; F02B 63/042; B60L 2200/26; B60L 50/61; B60L 1/00;
(Continued)

(56) References Cited

U.S. PATENT DOCUMENTS

2002/0174797 A1* 11/2002 Kumar ................. B60L 7/22
105/26.05
2010/0276993 A1* 11/2010 King .................. B60L 50/15
307/9.1

(Continued)

OTHER PUBLICATIONS

Search Report for French Patent Application No. FR 20 00205, dated Sep. 16, 2020 in 2 pages.

*Primary Examiner* — Lincoln D Donovan
*Assistant Examiner* — Alex W Lam
(74) *Attorney, Agent, or Firm* — Knobbe, Martens, Olson & Bear, LLP

(57) ABSTRACT

A system and method are for managing the energy supplied to a transport vehicle. A first and a second source of energy provide electrical energy to power at least one piece of consumer equipment of the vehicle. An intermediate energy transmission system receives electrical energy provided by at least one of the two sources of energy and transfers it to the at least one piece of consumer equipment. An energy conversion-control system applies, at the input of the intermediate energy transmission system, the electrical energy to be provided, adjusted depending on the operational state of the first source of energy and on an input signal indicative of an operational state of the second source. The first source of energy includes an internal combustion engine connected to a permanent-magnet alternator that is placed between the internal combustion engine and the energy conversion-control system.

11 Claims, 3 Drawing Sheets

(51) Int. Cl.
*F02B 63/04* (2006.01)
*B61C 3/00* (2006.01)
*B61D 27/00* (2006.01)

(52) U.S. Cl.
CPC ............ *B61D 27/00* (2013.01); *H02J 7/0048* (2020.01); *H02J 2207/20* (2020.01)

(58) Field of Classification Search
CPC ...... B60L 50/66; B60L 2240/52; B60L 58/20; B60L 1/12; B60L 1/003; B60L 3/0076; B61D 27/00; H02J 7/0048; H02J 2207/20; H02J 7/1415; H02J 7/1492; H02J 7/34; H02J 2310/40; H02J 1/12; H02J 7/1438; Y02T 10/62; Y02T 10/70; B60R 16/03; B60T 13/74; B62D 5/0457; H02M 3/156; H02M 3/157
See application file for complete search history.

(56) References Cited

U.S. PATENT DOCUMENTS

2014/0265913 A1* 9/2014 Chung ................... H05B 45/10
 315/291
2016/0046292 A1 2/2016 Kaisha

* cited by examiner

SYSTEM AND METHOD FOR MANAGING THE ENERGY SUPPLIED TO A TRANSPORT VEHICLE, AND CORRESPONDING TRANSPORT VEHICLE

CROSS-REFERENCE TO RELATED APPLICATION

This application claims priority to French Patent Application No. 20 00205 filed on Jan. 10, 2020, the disclosure of which including the specification, the drawings, and the claims is hereby incorporated by reference in its entirety.

FIELD OF THE INVENTION

The present invention concerns a system and method for managing the energy supplied aboard a transport vehicle, and a corresponding transport vehicle, particularly a rail vehicle.

The system and method according to the present invention are specially adapted to be used in railway vehicles, and will be described hereby by making specific reference to such application. However, this reference must not be considered as limiting the possibility of applying the management system or method according to the present invention to other types of transport vehicles, and the person skilled in the art will easily understand, upon reading the following description, that they may be used with any transport vehicle adapted to be powered by two different energy sources, in particular with hybrid traction, namely by combining a traditional energy source, for example of a thermal type, such as an internal combustion engine, with a source of electrical energy.

BACKGROUND OF THE INVENTION

It is known that in the field of transportation modern, fully electric traction vehicles, namely vehicles that are powered with electricity supplied for instance by rechargeable batteries placed aboard the vehicle, are subject to procedures for replacing the electrical energy used that are not totally efficient.

Indeed, the most commonly used procedures today consist of replacing drained batteries with fully charged batteries, or alternatively, connecting an external energy source to the vehicle and charging the batteries.

The primary drawback of these procedures is that the vehicles must remain out of service until the charging or replacement procedure is completed.

Another operational drawback of these electric vehicles is the service life of the batteries, which suffer from a limitation inherent in their autonomy.

One solution used to at least partially overcome the limitations indicated above consists of using hybrid electric vehicles, namely vehicles equipped with a second source of energy, generally of a traditional type, such as an internal combustion engine, which is added to the batteries and is also used to power the consumer equipment of the vehicle, particularly the traction system, and/or to recharge the batteries when necessary.

This solution at least partially solves the problems of recharging and replacing the batteries and the problems stemming from their operating autonomy, but at the same time it introduces other drawbacks.

In particular, introducing a second source of energy increases the complexity of the overall architecture of the energy production system, as well as its management, due to the multiple components used and the multiple parameters to control.

In fact, such an energy production system comprises two separate branches that are connected to a shared distribution bus and must be correctly coordinated.

For instance, along one branch, the direct current of the batteries must be controlled to manage the charging and discharging phases, and an additional DC-DC converter must be used between the batteries and a distribution bus shared with the other branch, to adjust the voltage applied at the input of the bus.

At the same time, along the other branch, it is necessary to control the voltage generated by the other source of energy; this normally entails using synchronous generators with excitation systems, diode rectifiers, their control devices, etc.

SUMMARY OF THE INVENTION

Consequently, a major aim of the present invention is to provide a solution that offers improvements over the known state of the art, and in particular, to substantially simplify the management of energy aboard a transport vehicle.

Within this context, one object of the present invention is to provide a solution with a simplified architecture compared to the solutions of the prior art, where the energy flows of the various components are more efficiently and better coordinated.

Another object of the present invention is to propose a solution for managing the supplied energy aboard a highly reliable transport vehicle, which is relatively easy to realize and at competitive costs.

This aim, these objects, and others that will become apparent below are achieved by a system for managing the energy supplied aboard a transport vehicle, comprising:

a first source of energy and a second source of energy configured to provide electrical energy intended to power at least one consumer equipment of the transport vehicle;

an intermediate energy transmission system connected to the first and second sources of energy and configured to receive electrical energy provided by at least one of the first and second sources of energy and to at least partially transfer the electrical energy received to the at least one consumer equipment to be powered;

an energy conversion-control system connected to at least one of the first and second sources of energy and configured to apply, at the input of the intermediate energy transmission system, the electrical energy to be provided by at least one of the first and second sources of energy adjusted based on the operational state of the first source of energy and on an input signal indicative of an operational state of the second source of energy;

wherein the first source of energy comprises an internal combustion engine connected to a permanent-magnet alternator that is placed between the internal combustion engine and the energy conversion-control system.

According to advantageous but non-mandatory aspects of the invention, such a management system can incorporate one or more of the following features, taken in any technically feasible combination:

the energy conversion-control system is configured to apply, as an input to the intermediate energy transmission system, the electrical energy to be provided by the first source of energy, adjusted in such a way that at least one consumer equipment is powered with electrical energy provided simultaneously by the first source of energy and by the second source of energy;

the energy conversion-control system is configured to apply, as an input to the intermediate energy transmission system, the electrical energy to be provided by the first source of energy, adjusted in such a way that the at least one consumer equipment and/or the second source of energy are supplied with electrical energy provided by the first source of energy;

the energy conversion-control system is configured so that at the at least one consumer equipment and/or the first source of energy are supplied with electrical energy provided by the second source of energy;

the second source of energy comprises a source of direct current (DC) connected directly to the intermediate energy transmission system;

the first source of energy comprises an alternating current (AC) electricity generating system, the second source comprises a DC direct current energy storage device, and the energy conversion-control system comprises an AC-DC converter associated with a control module that is configured to apply, as an input to the intermediate energy transmission system, the electrical energy to be provided by the first source of energy based on the operational state of the AC alternating current electricity generating system and converted by the AC-DC converter, and on a signal provided as an input to the control module indicative of the state of charge of the direct current storage device.

the energy conversion-control system comprises a four-quadrant converter;

the second source of energy comprises one or more rechargeable batteries;

the intermediate energy transmission system comprises a common bus connected, at its input, to the second source of energy and to the energy conversion-control system, and at its output, to a DC-AC supply inverter of at least one consumer equipment to be powered.

The aforementioned aim and objects of the present invention are also achieved by a method for managing the energy supplied to a transport vehicle, comprising:

(a): providing, by means of a first source of energy and a second source of energy placed aboard the vehicle and connected to an intermediate energy transmission system, electrical energy intended to power at least one consumer equipment of the transport vehicle, the intermediate energy transmission system being configured to receive energy provided by at least one of the first and second sources of energy and to at least partially transfer the electrical energy received to the at least one consumer equipment to be powered;

(b): applying, as an input of the intermediate energy transmission system by means of a conversion-control system, the desired electrical energy to be provided by at least one of the first and second sources of energy, adjusted based on the operational state of the first source of energy and on a signal indicative of an operational state of the second source, received as an input by the conversion-control system, wherein the first source of energy comprises an internal combustion engine connected to a permanent-magnet alternator that is placed between the internal combustion engine and the energy conversion-control system.

Finally, the aforementioned aim and objects of the present invention are also achieved by a transport vehicle, in particular of the hybrid traction type, and notably a railway vehicle, adapted to interact with, or comprising, a system for managing energy supplied aboard the transport vehicle, the system comprising:

a first source of energy and a second source of energy configured to provide electrical energy intended to power at least one consumer equipment of the transport vehicle;

an intermediate energy transmission system connected to the first and second sources of energy and configured to receive electrical energy provided by at least one of the first and second sources of energy and to at least partially transfer the electrical energy received to the at least one consumer equipment to be powered;

an energy conversion-control system connected to at least one of the first and second sources of energy and configured to apply, at the input of the intermediate energy transmission system, the electrical energy to be provided by at least one of the first and second sources of energy adjusted based on the operational state of the first source of energy and on an input signal indicative of an operational state of the second source of energy;

wherein the first source of energy comprises an internal combustion engine connected to a permanent-magnet alternator that is placed between the internal combustion engine and the energy conversion-control system.

BRIEF DESCRIPTION OF THE DRAWINGS

Other aspects and advantages of the invention will become apparent upon reading the following description, given solely as an example and made with reference to the attached drawings, among which.

DETAILED DESCRIPTION OF THE PREFERRED EMBODIMENTS

It should be noted that to clearly and concisely describe the present invention, the drawings are not necessarily to scale, and certain features may be presented schematically.

Furthermore, whenever the term "adapted" or "arranged" or "configured" is used here with reference to any component as a whole or any part of a component, or a combination of components, it must be understood to signify and encompass the structure and/or configuration and/or shape and/or positioning of the component or part that such term refers to.

In particular, with respect to electronic means/modules and/or software, each of the terms indicated above encompasses the electronic circuits, as well as the software code and/or algorithms or complete programs whether stored or under execution.

Figure 1:
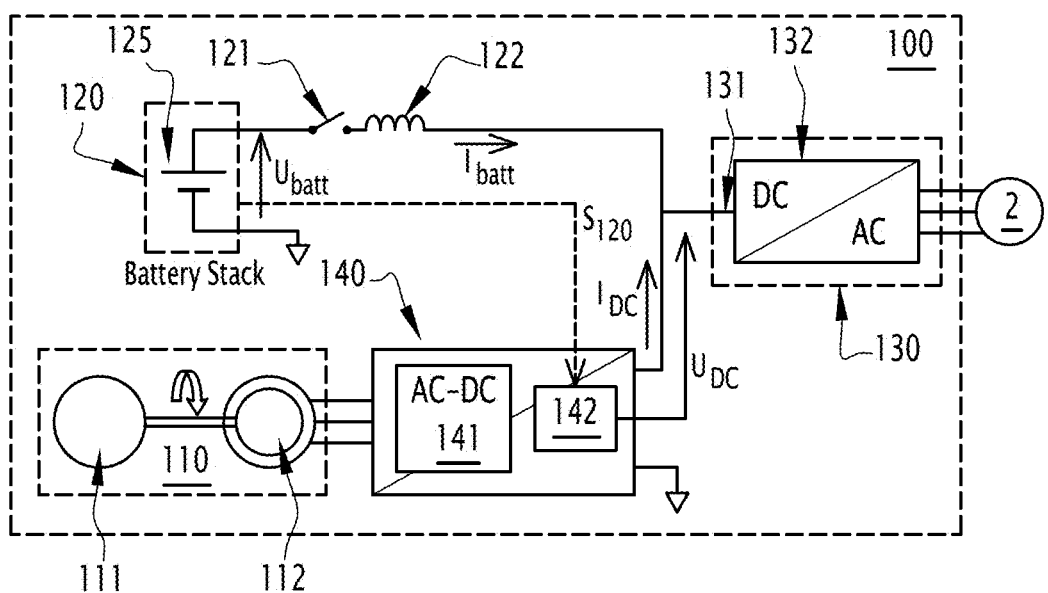
FIG. 1 is a schematic representation of a system for managing energy supplied aboard a transport vehicle according to the present invention.

FIG. 1 schematically illustrates a system according to the present invention, designated by reference number 100, for managing energy supplied aboard a transport vehicle.

Figure 3:
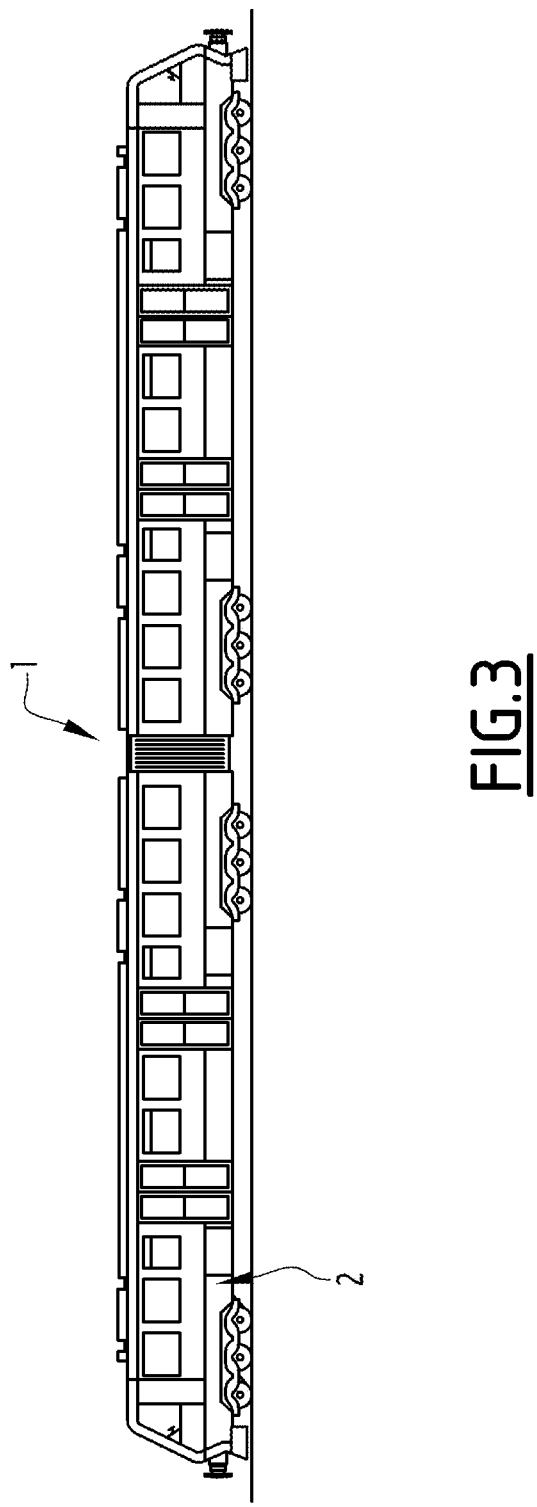
FIG. 3 schematically shows an example of a transport vehicle, notably a railway vehicle, comprising the system for managing supplied energy as illustrated in FIG. 1.

An example of a transport vehicle, in particular a railway vehicle, is depicted in FIG. 3 and designated by reference number 1.

The definition of "transport vehicle" used here must be interpreted in the broadest possible sense, and may therefore be considered to cover rail vehicles, such as locomotives, trams, and trains, as well as cars and buses, that have two sources of energy supplied aboard in order to power one or more consumer equipment 2 of the transport vehicle 1 in a coordinated fashion.

As illustrated in FIG. 1, the management system 100 according to the present invention comprises a first source of energy 110 or primary source, and a second source of energy 120 or secondary source, which are placed aboard the vehicle 1 and are configured to provide electrical energy intended to power one or more consumer equipment of the transport vehicle 1.

In particular, the consumer equipment 2 of the transport vehicle 1 are energy consuming devices or systems and comprise a propulsion system 2 which, depending on the type of vehicle 1 and in a manner known per se or readily available to the person skilled in the art, may comprise, or be constituted by, for instance an electrical traction motor or equivalent traction or propulsion devices.

Furthermore, the consumer equipment 2 may comprise other devices to be powered with energy provided by the first source of energy 110 and/or by the second source of energy 120, such as HVAC systems, notably heating, ventilation and/or air conditioning systems intended for the comfort of the passengers of the vehicle, lighting systems, or auxiliary converters, not illustrated in the Figures.

The management system 100 according to the invention further comprises:

an intermediate energy transmission system, indicated in FIG. 1 by reference number 130, which is connected to the first source of energy 110 and to the second source of energy 120, and which is configured to receive the electrical energy provided by at least one of the first and second sources of energy 110, 120, and to at least partially transfer the electrical energy received to at least one consumer equipment to be powered, for instance to the traction system 2 of the vehicle 1; and an energy conversion-control system 140 that is connected at least to the first source of energy 110 to receive a supply voltage generated as output by the first source of energy 110.

Advantageously, the energy conversion-control system 140 is configured to apply, in input to the intermediate energy transmission system 130 the electrical energy to be provided by at least the first source 110 adjusted based on the operational state of the first source of energy 110 and on a signal indicative of an operational state of the second source, and in particular to apply a desired supply voltage $U_{DC}$ adjusted based on the supply voltage from the first source of energy 110 and on a signal $S_{120}$ indicative of an operational state of the second source 120, received as an input by the conversion-control system 140.

According to embodiments of the management system 100, the energy conversion-control system 140 is configured to apply, as an input to the intermediate energy transmission system 130 and depending on the operational state of the first source of energy 110 and on the signal $S_{120}$ indicative of the operational state of the second source 120, received as input:

electrical energy provided simultaneously by the first source of energy 110 and by the second source of energy 120; and/or electrical energy provided solely by the first source of energy 110 and consumed by a consumer equipment 2 and/or the second source of energy 120; and/or electrical energy provided solely by the second source of energy 120 and consumed by a consumer equipment 2 and/or the first source of energy 110.

The supplying of the first source of energy 110 by the second source of energy corresponds to a particular embodiment for starting the internal combustion engine 111.

According to one possible embodiment of the system 100, the second source of energy 120 comprises a direct-current (DC) source of electricity connected to the intermediate energy transmission system 130, preferably directly, i.e. without interposing additional conversion devices, such as DC-DC converters required in solutions of the prior art to modify the direct current (DC) generated at the output of the second source 120 before applying it as input to the intermediate system 130.

In fact, as illustrated in FIG. 1, between the second source of energy 120 and the intermediate energy transmission system 130, only safety components are provided, such as a switch 121, and/or filtering components, such as an inductor 122 to filter the supply current $I_{batt}$.

According to one embodiment, the second source of energy 120 comprises at least one rechargeable energy storage device adapted to store and/or deliver direct-current DC supply energy.

According to one possible embodiment, as schematically illustrated in FIG. 1, the storage device comprises, for instance, one or more rechargeable battery(-ies) 125 placed aboard the vehicle 1.

According to one embodiment, the first source of energy 110 comprises an alternating-current AC electricity generating system.

In particular, the first source of energy 110 comprises a thermal engine 111, particularly an internal combustion engine, preferably a diesel engine, connected to a permanent magnet alternator 112 that is placed between the diesel engine 111 and the energy conversion-control system 140.

This combination, and in particular the use of a permanent magnet alternator 112, makes it possible to increase the efficiency of the first source of energy compared to solutions of the prior art using alternators with their excitation systems.

In turn, the energy conversion-control system 140 comprises an AC-DC converter 141 associated with a control module 142.

In particular, the control module 142 is configured to apply, in input to the intermediate energy transmission system 130, the electrical energy to be provided by the first source or primary source 110 represented by direct (or DC) current $I_{DC}$ and supply voltage $U_{DC}$. The desired supply current $I_{DC}$ is determined based on the embodiment and particularly the contribution desired by the second source 120, represented by the current $I_{batt}$. The control module 142 takes into account the operational state of the system 110 for generating alternating-current (AC) electricity converted by the AC-DC converter 141, and of the signal $S_{120}$ provided as input to the same control module 142, the signal $S_{120}$ being representative, generally speaking, of the operational state of the second source 120, and more particularly indicative of the state of charge of the direct-current storage device 120.

Advantageously, in the management system 100 according to the present invention, the energy conversion-control system 140 comprises a four-quadrant converter or 4QC.

The four-quadrant converter or 4QC may be of a type commercially available on the market, including in a manner known per se an AC-DC converter and an associated command module, and which is suitably equipped with electronic circuits and/or circuits programmed with software code to perform the conversion and control functionalities for which it is used in the management system 100, as described herein.

The signal $S_{120}$ indicative of the state of charge of the direct-current storage device 120 may be provided to the control module 142 of the conversion-control system by an additional detector that is not illustrated, for instance by a voltage detector providing the value of the voltage $U_{batt}$ at the output of the storage device 120, at the terminals of one or more of the battery(-ies) 125, or directly by the internal management system of the batteries 125.

Depending on the current value of the detected state of charge, the conversion-control system 140, and in particular the control module 142, may be programmed for instance to apply at the input of the intermediate energy transmission system 130, a desired intermediate supply voltage value $U_{DC}$, correctly adjusted based on the thresholds tied to the corresponding charge levels.

Therefore, the supply voltage $U_{batt}$ determines the state of charge of the batteries 125 and with that information, it is possible to decide whether energy stored in the batteries 125 must be used, e.g. to power the traction and/or auxiliary devices of the vehicle, if the value of the voltage $U_{batt}$ is above a certain threshold, or whether the batteries 125 must be charged, e.g. during electrical braking or by the first source of energy 110 if that value is below a certain threshold.

Consequently, and as indicated above, the conversion-control system 140 may power one or more consumer equipment 2 with the supply energy provided by a single source 110 or 120, or simultaneously with the energy provided by two sources of energy 110, 120; it may also share the energy provided by a source to power the other source as well as one or more consumer equipment 2 to save fuel.

Finally, according to one possible embodiment, the intermediate energy transmission system 130 comprises, for instance, a common bus 131 that is connected, at its input, to a second source of energy 120 and to the energy conversion-control system 140, and at its output to a DC-AC inverter 132, for instance a traction inverter intended to power the traction system 2 of the vehicle 1.

Figure 2:
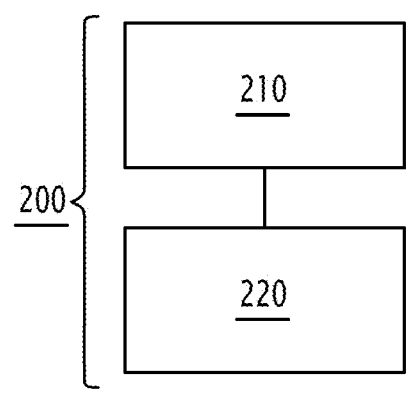
FIG. 2 is a block diagram schematically illustrating a method for managing energy supplied aboard a transport vehicle according to the present invention.

A method 200 for managing the energy supplied aboard a transport vehicle 1, according to the present invention, is described below with reference to FIG. 2.

In particular, the method 200 comprises:
  210: providing, by means of a first source of energy 110 and a second source of energy 120 placed aboard the vehicle 1 and connected to an intermediate energy transmission system 130, electrical energy intended to power at least one consumer equipment 2 of the transport vehicle 1, the intermediate energy transmission system 130 being configured to receive energy provided by at least one of the first and second sources of energy 110, 120 and to at least partially transfer the electrical energy received to the at least one consumer equipment 2 to be powered;
  220: applying, as an input of the intermediate energy transmission system 130 by means of a conversion-control system 140, the desired electrical energy to be provided by at least the first source of energy 110, adjusted based on the operational state of the first source of energy 110 and on a signal $S_{120}$ indicative of an operational state of the second source 120, received as an input by the conversion-control system 140, wherein the first source of energy 110 comprises an internal combustion engine 111 connected to a permanent-magnet alternator 112 that is placed between the internal combustion engine 111 and the energy conversion-control system 140.

In particular, as indicated above, based on the value of the voltage generated by the first source 110 and on the current operational state of the second source 120, particularly its state of charge, the desired supply voltage $U_{DC}$ is adjusted by the energy conversion-control system 140 so that the at least one consumer equipment 2 is powered with electrical energy provided simultaneously by the first source of energy 110 and by the second source of energy 120; and/or so that the at least one consumer equipment 2 and the second source energy 120 are powered simultaneously with electrical energy provided simultaneously with electrical energy provided by the first source of energy 110, and/or so that the at least one consumer equipment 2 and the first source of energy 110 are powered simultaneously with electrical energy provided by the second source of energy 120.

It is clear from the foregoing description that the system 100 and the management method 200, as well as the corresponding transport vehicle 1, make it possible to achieve the aim at the base of the present invention and the stated objectives, since the management of the energy available aboard the vehicle is simpler and more effective with respect to the solutions of the prior art.

In particular, the use of a single conversion-control system for both sources of energy, notably a four-quadrant converter or 4QC, makes it possible to simultaneously manage and better coordinate flows of electrical energy between the first source of energy 110, the second source of energy 120, and the intermediate system 130, as well as to simplify the constructive architecture of the whole system, for example by eliminating a DC-DC converter normally used in solutions of the prior art, between the source of DC electricity and the intermediate supply energy transfer systems.

These results are obtained through an efficient, highly flexible solution that may be applied when constructing any new transport vehicle or when servicing existing vehicles, with simple modifications.

The system 100, the method 200 and the vehicle 1 thus conceived are subject to modifications and variations that fall within the scope of the invention as defined in particular by the attached claims, and all the details may furthermore be replaced by technically equivalent components. For instance, it is possible to use other types of storage devices, such as capacitors or ultracapacitors, and the alternating current electricity generating system may comprise other types of engines, such as internal combustion engines powered by fuels other than diesel.

What is claimed is:
1. A system for managing the energy supplied aboard a transport vehicle, comprising:
  a first source of energy and a second source of energy configured to provide electrical energy intended to power at least one consumer equipment of the transport vehicle;
  an intermediate energy transmission system connected to the first and second sources of energy and configured to receive electrical energy provided by at least one of the first and second sources of energy and to at least partially transfer the electrical energy received to the at least one consumer equipment to be powered;
  an energy conversion-control system connected to at least one of the first and second sources of energy and configured to apply, at the input of the intermediate energy transmission system, the electrical energy to be provided by at least one of the first and second sources of energy adjusted based on the operational state of the first source of energy and on an input signal indicative of an operational state of the second source of energy, wherein the first source of energy comprises an internal combustion engine connected to a permanent-magnet alternator that is placed between the internal combustion engine and the energy conversion-control system.

2. The system according to claim 1, wherein the energy conversion-control system is configured to apply, as an input to the intermediate energy transmission system, the electrical energy to be provided by the first source of energy, adjusted in such a way that at least one consumer equipment is powered with electrical energy provided simultaneously by the first source of energy and by the second source of energy.

3. The system according to claim 1, wherein the energy conversion-control system is configured to apply, as an input to the intermediate energy transmission system, the electrical energy to be provided by the first source of energy, adjusted in such a way that the at least one consumer equipment and/or the second source of energy are being supplied with electrical energy provided by the first source of energy.

4. The system according to claim 1, wherein the energy conversion-control system is configured so that at the at least one consumer equipment and/or the first source of energy are powered with electrical energy provided by the second source of energy.

5. The system according to claim 1, wherein the second source of energy comprises a direct-current (DC) source of electricity connected to the intermediate energy transmission system.

6. The system according to claim 1 wherein the first source of energy comprises an alternating current (AC) electricity generating system, the second source comprises a direct current (DC) energy storage device, and the energy conversion-control system comprises an AC-DC converter associated with a control module that is configured to apply, as an input to the intermediate energy transmission system, the electrical energy to be provided by the first source of energy based on the operational state of the alternating current (AC) electricity generating system and converted by the AC-DC converter, and on a signal provided as an input to the control module indicative of the state of charge of the direct current storage device.

7. The system according to claim 6, wherein the energy conversion-control system comprises a four-quadrant converter (4QC).

8. The management system according to claim 1, wherein the intermediate energy transmission system comprises a common bus connected, at its input to the second source of energy and to the energy conversion-control system, and at its output to a DC-AC supply inverter of at least one consumer equipment to be powered.

9. A method for managing the energy supplied aboard a transport vehicle, comprising:

providing, by means of a first source of energy and a second source of energy placed aboard the vehicle and connected to an intermediate energy transmission system, electrical energy intended to power at least one consumer equipment of the transport vehicle, the intermediate energy transmission system being configured to receive energy provided by at least one of the first and second sources of energy and to at least partially transfer the electrical energy received to the at least one consumer equipment to be powered; and applying, as an input to the intermediate energy transmission system by means of a conversion-control system, the desired electrical energy to be provided by at least one of the first and second sources of energy, adjusted based on the operational state of the first source of energy and on a signal indicative of an operational state of the second source, received in input by the conversion-control system, wherein the first source of energy comprises an internal combustion engine connected to a permanent-magnet alternator that is placed between the internal combustion engine and the energy conversion-control system.

10. A transport vehicle comprising a system for managing the energy supplied aboard of the vehicle, wherein said system for managing the energy supplied comprises:

a first source of energy and a second source of energy configured to provide electrical energy intended to power at least one consumer equipment of the transport vehicle;

an intermediate energy transmission system connected to the first and second sources of energy and configured to receive electrical energy provided by at least one of the first and second sources of energy and to at least partially transfer the electrical energy received to the at least one consumer equipment to be powered;

an energy conversion-control system connected to at least one of the first and second sources of energy and configured to apply, at the input of the intermediate energy transmission system, the electrical energy to be provided by at least one of the first and second sources of energy adjusted based on the operational state of the first source of energy and on an input signal indicative of an operational state of the second source of energy, and wherein the first source of energy comprises an internal combustion engine connected to a permanent-magnet alternator that is placed between the internal combustion engine and the energy conversion-control system.

11. The transport vehicle according to claim 10, wherein the vehicle is a railway vehicle.

* * * * *